United States Patent
Eisen et al.

(10) Patent No.: US 10,944,788 B2
(45) Date of Patent: Mar. 9, 2021

(54) SYSTEMS AND METHODS FOR COMMUNICATION VERIFICATION

(71) Applicant: Trusona, Inc., Scottsdale, AZ (US)

(72) Inventors: Ori Eisen, Scottsdale, AZ (US); David Michael Kopack, Scottsdale, AZ (US); Nikolas Mangu-Thitu, Lexington, KY (US)

(73) Assignee: TRUSONA, INC., Scottsdale, AZ (US)

( * ) Notice: Subject to any disclaimer, the term of this patent is extended or adjusted under 35 U.S.C. 154(b) by 209 days.

(21) Appl. No.: 15/945,884

(22) Filed: Apr. 5, 2018

(65) Prior Publication Data
US 2018/0295153 A1    Oct. 11, 2018

Related U.S. Application Data

(60) Provisional application No. 62/483,281, filed on Apr. 7, 2017.

(51) Int. Cl.
*H04L 29/06* (2006.01)
*H04L 12/58* (2006.01)

(52) U.S. Cl.
CPC .......... *H04L 63/1483* (2013.01); *H04L 51/12* (2013.01); *H04L 63/0236* (2013.01); *H04L 63/0254* (2013.01); *H04L 63/08* (2013.01); *H04L 63/1433* (2013.01); *H04L 51/38* (2013.01)

(58) Field of Classification Search
CPC . H04L 63/1483; H04L 63/1433; H04L 63/08; H04L 63/0254; H04L 63/0236; H04L 51/12; H04L 51/38
See application file for complete search history.

(56) References Cited

U.S. PATENT DOCUMENTS

| | | | | |
|---|---|---|---|---|
| 7,818,383 B2 * | 10/2010 | Kodama | ................. | H04L 51/28 709/206 |
| 8,607,335 B1 * | 12/2013 | Liu | ....................... | G06F 21/567 713/188 |
| 9,237,121 B1 * | 1/2016 | Graham | .................. | H04L 51/12 |
| 9,847,973 B1 * | 12/2017 | Jakobsson | ........... | H04L 63/0245 |
| 2005/0198144 A1 * | 9/2005 | Kraenzel | ............. | G06Q 10/107 709/206 |
| 2006/0149823 A1 | 7/2006 | Owen et al. | | |
| 2006/0168028 A1 * | 7/2006 | Duxbury | ................. | H04L 51/12 709/206 |

(Continued)

FOREIGN PATENT DOCUMENTS

WO      WO-03054764 A1      7/2003

*Primary Examiner* — Aravind K Moorthy
(74) *Attorney, Agent, or Firm* — Wilson Sonsini Goodrich & Rosati

(57) ABSTRACT

Provided herein are systems and methods for verifying online communications. A sender and/or a recipient of an online communication can be a registered user of a verification system. Upon request by the sender and/or the recipient in relation to a particular instance of an online communication, the verification system can (1) confirm that the sender and/or the recipient is a registered user of the verification system, (2) verify that the sender and/or the recipient has sent and/or received, respectively, the particular instance of the online communication, and (3) communicate the verification of the particular instance of online communication to the sender and/or the recipient.

20 Claims, 5 Drawing Sheets

(56) References Cited

U.S. PATENT DOCUMENTS

| | | | | |
|---|---|---|---|---|
| 2008/0165972 | A1* | 7/2008 | Worthington | H04L 63/06 380/278 |
| 2008/0172468 | A1 | 7/2008 | Almeida et al. | |
| 2008/0301219 | A1* | 12/2008 | Thornburgh | H04L 67/101 709/203 |
| 2008/0320417 | A1* | 12/2008 | Begley | G06Q 10/107 715/822 |
| 2009/0012984 | A1* | 1/2009 | Ravid | G06F 40/194 |
| 2009/0028306 | A1* | 1/2009 | Rhie | H04L 51/066 379/93.01 |
| 2009/0044006 | A1* | 2/2009 | Shim | G06Q 10/107 713/151 |
| 2009/0248823 | A1* | 10/2009 | Li | H04L 51/14 709/206 |
| 2011/0010547 | A1* | 1/2011 | Noda | H04L 9/3242 713/168 |
| 2011/0060796 | A1* | 3/2011 | Grigsby | G06Q 10/107 709/206 |
| 2011/0264808 | A1* | 10/2011 | Eriksson | H04L 69/28 709/227 |
| 2012/0079591 | A1* | 3/2012 | Hassan-Le Neel | H04W 4/00 726/22 |
| 2012/0158877 | A1* | 6/2012 | Shuster | H04L 51/12 709/206 |
| 2012/0311669 | A1* | 12/2012 | Akase | H04L 63/083 726/3 |
| 2013/0086654 | A1* | 4/2013 | Tomkow | H04L 63/08 726/5 |
| 2013/0332607 | A1* | 12/2013 | Santamaria | H04L 63/0823 709/225 |
| 2015/0044998 | A1* | 2/2015 | Roh | H04W 4/12 455/411 |
| 2015/0304849 | A1* | 10/2015 | Moon | H04W 12/06 455/411 |
| 2016/0162695 | A1* | 6/2016 | Scafaria | G06F 21/602 726/1 |
| 2016/0301701 | A1* | 10/2016 | Snyder | H04L 63/08 |
| 2016/0335549 | A1* | 11/2016 | Ahuja-Cogny | G06F 8/40 |
| 2017/0264611 | A1* | 9/2017 | Alen | H04L 63/0884 |
| 2018/0013764 | A1* | 1/2018 | Morrison | H04L 63/102 |
| 2018/0096351 | A1* | 4/2018 | Dahn | G06Q 20/223 |
| 2019/0197103 | A1* | 6/2019 | Kroner | G06F 40/30 |

\* cited by examiner

180

| To: | Recipient <recipient@recipientmailserver.com> | ← 181 |
| Cc: | verify@verificationserverdomain.com | ← 182 |
| Bcc: | Example <example@exampleserver.com> | ← 183 |
| Subject: | URGENT - Wire Transfer Request | ← 184 |

Hi recipient,

Hope you had a good weekend. This is an urgent request. Please process by 3pm today. $xx,xxx.00 dollars to Client XYZ. Let me know if you have any questions.

- Sender

| | |
|---|---|
| From: | Sender <sender@sendermailserver.com> ← 191 |
| To: | Recipient <recipient@recipientmailserver.com> ← 192 |
| Cc: | verify@verificationserverdomain.com ← 193 |
| Subject: | URGENT - Wire Transfer Request ← 194 |

Hi recipient,

Hope you had a good weekend. This is an urgent request. Please process by 3pm today. $xx,xxx.00 dollars to Client XYZ. Let me know if you have any questions.

- Sender

SYSTEMS AND METHODS FOR COMMUNICATION VERIFICATION

CROSS-REFERENCE

This application claims the benefit of U.S. Provisional Application No. 62/483,281, filed Apr. 7, 2017, which application is entirely incorporated herein by reference.

BACKGROUND

Identity theft can present a serious problem during online communication. In certain instances, users may pose as other users to defraud others. For example, a fraudulent user may pose as a sender that a recipient knows or trusts to send an electronic mail (email) to the recipient. The fraudulent user may request personal and sensitive information or other materials, such as a form of financial credit, from the recipient. In the process, the recipient may receive real and lasting damage from the communication by leaking personal and sensitive information or providing other assets of value to the fraudulent user. In some instances, a fraudulent user may use more sophisticated scamming schemes, such as Business Email Compromise (BEC), to specifically target businesses that regularly perform financial transfer payments (e.g., wire transfers) into directing such payments to a fraudulent destination. During a BEC scheme, a fraudulent user may closely study a target business to inconspicuously infiltrate an email communication network of the target business and ultimately induce one or more affiliates of the target business to believe that an email communication actually originating from the fraudulent user originates from a trusted source (e.g., officer, member, employee, client, partner, contacts, etc.) of the target business.

Oftentimes, manually verifying a sender or a recipient of an online communication can be cumbersome and time-consuming for users.

SUMMARY

Recognized herein is the need for systems and methods for verifying online communications. Furthermore, a need exists to verify that a communication originated from a purported source of the communication.

A sender of an online communication, such as an electronic mail (email), may wish to verify that an intended recipient received the online communication. Similarly, a recipient of an online communication may wish to verify that the online communication was sent from a trusted, known, and/or otherwise verified sender. In some instances, a sender of an email can be a preregistered user of a verification system for facilitating verification of online communications. In some instances, a recipient of an email can be a preregistered user of the verification system. The verification system may store a verified email address of each preregistered user. The verification system may thereafter access the verified email addresses of each registered user of the verification system upon request by a sender and/or a recipient in relation to a particular instance of an online communication to (1) confirm that the sender and/or the recipient is a registered user of the verification system, (2) verify that the sender and/or the recipient has sent and/or received, respectively, the particular instance of the online communication, and (3) communicate the verification of the particular instance of online communication to the sender and/or the recipient.

Provided are systems and methods for verifying online communications. In an aspect, a first user sending a first electronic mail (email) to a second user may initiate a verification session by sending the first email to both an email address of the second user and an email address of a verification server, which verification server is configured to implement operations and methods of the verification system. Through a verification session of the first email, the second user receiving the first email from the first user may be able to verify (1) whether the first user is a verified (or registered) user of the verification system, and/or (2) whether the first user in fact sent the first email. Through the verification session of the first email, the first user sending the first email may be able to verify (1) whether the second user is a verified (or registered) user of the verification system, and/or (2) whether the second user safely received the first email.

In an aspect, provided is a computer-implemented method for verifying a first electronic mail (email) from a first user to a second user, the method comprising: (a) initiating a verification session, wherein the verification session is initiated by the first user sending the first email to both an email address of the second user and an email address of a verification server configured to facilitate verification of online communications; (b) verifying a registration status of the first user with the verification server, wherein verifying the registration status of the first user comprises determining that a return path email address of the first email matches a given verified email address stored in the verification server; (c) upon verifying the registration status of the first user, sending a confirmation email from the email address of the verification server to the return path email address of the first email, wherein the confirmation email comprises instructions for confirming that the first user sent the first email; (d) receiving a confirmation or denial from the first user; and (e) sending a verification notification email or a denial notification email from the email address of the verification server to the email address of the second user if a confirmation or denial is received from the first user, respectively.

In some embodiments, the verification notification email comprises instructions for confirming acceptance of the first email by the second user.

In some embodiments, the method further comprises (i) receiving a confirmation of acceptance of the first email from the second user, and (ii) sending an acceptance notification email from the email address of the verification server to the return path email address of the first email.

In some embodiments, the given verified email address is stored in the verification server when an owner of the given verified email address is registered to the verification server and has verified ownership of the given verified email address.

In some embodiments, the instructions for confirming is selected from one or more of clicking on a unique confirmation link, button, or hyperlink provided in the body of the confirmation email, re-entering a code or a password provided in the body of the confirmation email into another location, and scanning a code.

In some embodiments, the confirmation email comprises instructions for confirming within a finite time restraint.

In some embodiments, the confirmation email includes a copy of a body of the first email.

In some embodiments, the email address of the verification server is a recipient of a carbon copy of the first email. In some embodiments, the email address of the verification server is a recipient of a blind carbon copy of the first email.

In another aspect, provided is a system for verifying a first electronic mail (email) from a first user to a second user, the system comprising: a communications interface in communication with a first user device of the first user and a second user device of the second user over a computer network; a database configured to store a plurality of verified email addresses; and one or more computer processors operatively coupled to the communications interface and the database, wherein the one or more computer processors are individually or collectively programmed to: (a) initiate a verification session, wherein the verification session is initiated by the first user, via the first user device, sending the first email to both an email address of the second user and an email address of the communications interface; (b) verify a registration status of the first user, wherein verifying the registration status of the first user comprises determining that a return path email address of the first email matches a given verified email address from the plurality of verified email addresses stored in the database; (c) upon verifying the registration status of the first user, send a confirmation email from the email address of the communications interface to the return path email address of the first email, wherein the confirmation email comprises instructions for confirming that the first user sent the first email; (d) receive a confirmation or denial from the first user device of the first user; and (e) send a verification notification email or a denial notification email from the email address of the communications interface to the email address of the second user, to the second user device, if a confirmation or denial is received from the first user, respectively.

In some embodiments, the verification notification email comprises instructions for confirming acceptance of the first email by the second user. In some embodiments, the one or more computer processors are individually or collectively programmed to: (i) receive a confirmation of acceptance of the first email from the second user device of the second user, and (ii) send an acceptance notification email from the email address of the verification server to the return path email address of the first email.

In some embodiments, the given verified email address is stored in the database when an owner of the given verified email address has verified ownership of the given verified email address.

In some embodiments, the instructions for confirming is selected from one or more of clicking on a unique confirmation link, button, or hyperlink provided in the body of the confirmation email, re-entering a code or a password provided in the body of the confirmation email into another location, and scanning a code.

In some embodiments, the confirmation email comprises instructions for confirming within a finite time restraint.

In some embodiments, the confirmation email includes a copy of a body of the first email.

In some embodiments, the email address of the verification server is a recipient of a carbon copy of the first email. In some embodiments, the email address of the verification server is a recipient of a blind carbon copy of the first email.

In another aspect, provided is a computer-implemented method for verifying a first electronic mail (email) from a first user to a second user, the method comprising: (a) initiating a verification session, wherein the verification session is initiated by the first user sending the first email to both an email address of the second user and an email address of a verification server configured to facilitate verification of online communications; (b) sending a confirmation email from the email address of the verification server to the return path email address of the first email, wherein the confirmation email comprises instructions for confirming that the first user sent the first email with a finite time limit; (c) confirming a lack of response from the return path email address of the first email during the finite time limit; and (d) upon lapse of the finite time limit, sending a denial notification email from the email address of the verification server to the email address of the second user.

In some embodiments, the confirmation email includes a copy of a body of the first email.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 1B shows an exemplary email to be sent to a recipient by a sender.

FIG. 1C shows an exemplary email received by a recipient from a sender.

DETAILED DESCRIPTION

Figure 1A:
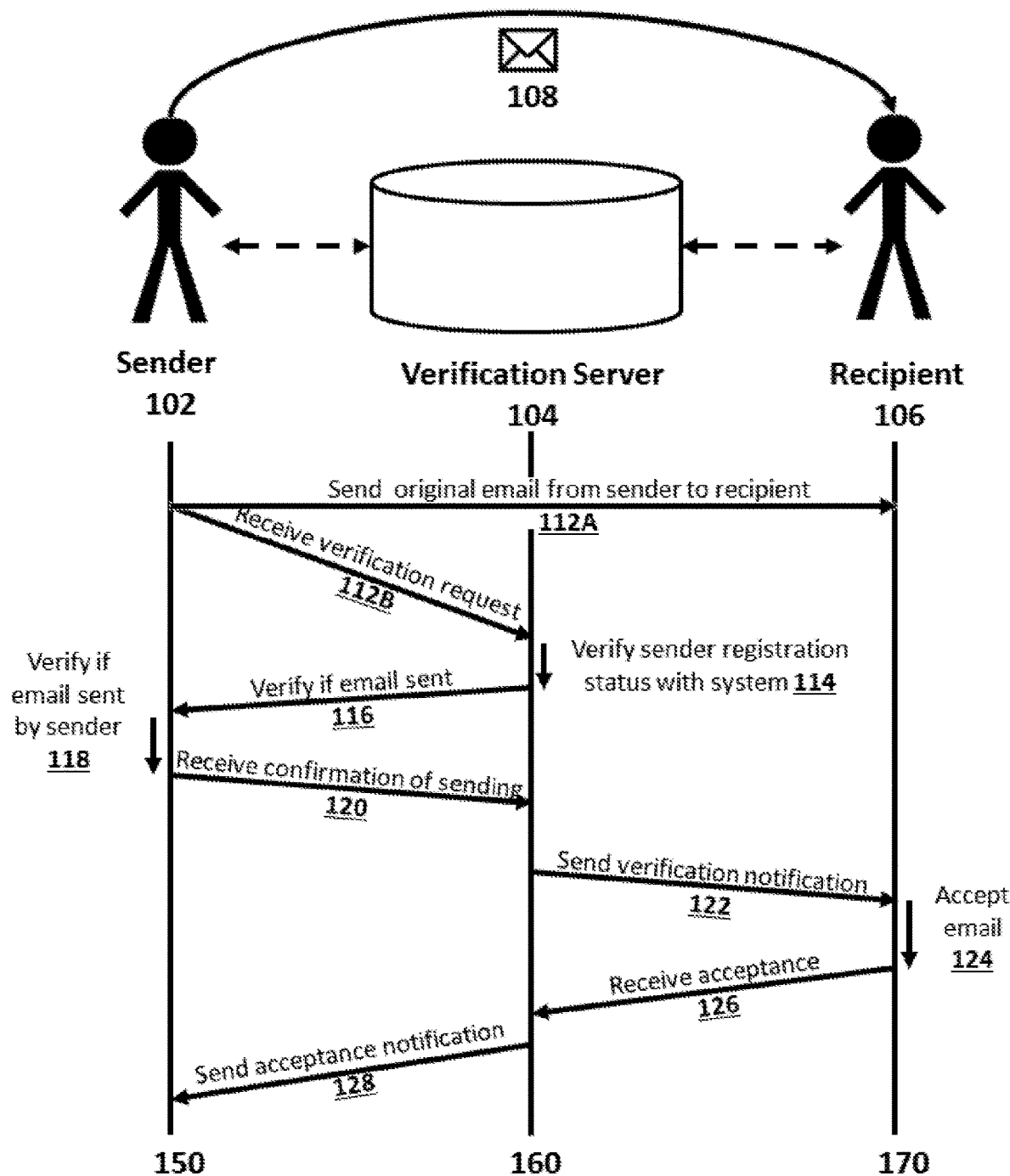
FIG. 1A shows a process flow diagram of a verification session initiated by a sender.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

A verification system can be accessible by one or more users. A user can be an individual or entity that is capable of initiating (e.g., sending) or receiving an online communication. The online communication can be an electronic mail (email). The online communication can be any message sent from a first server to a second server via an online connection, such as a network. For example, the user can be a sender of an email. In another example, the user can be a recipient of an email. In some instances, the user can be a registered user of the verification system. A user can be registered to the system if a user has opened an online account with the system. In some cases, a user may be an unregistered user of the verification system.

The online account can be dedicated to, and/or owned by, the user. User-specific information (e.g., name, email, organization, etc.) can be associated with a user's online account. Accordingly, the verification system can identify between registered users of the system by a user's online account. Access to an online account can be protected by associating user credentials, such as a username and accompanying password, of the user to the online account and requiring provision of the user credentials when a user requests access to the online account. Online accounts can be stored in a memory storage and/or a database of a server (such as a verification server 104 in FIG. 1) of the system.

An online communication, such as an email, can involve a sender and at least one recipient. When a recipient receives an online communication from a sender, the recipient may typically be provided with information such as: a name (or display name) of the sender, an address (e.g., email address) of the sender which can also be a return path address, a name and/or address of other recipients (e.g., including recipients receiving a carbon copy (Cc)), a name (or display name) of the intended recipient, an address (e.g., email address) of the recipient, a receiving and/or sending time stamp of the online communication, a priority status (e.g., flags) of the online communication as indicated by the sender, a subject (or title) of the online communication, the content of the online communication (e.g., including a message and/or attachments), any other information relating to an identity of the sender or the recipient, and/or a combination of the above. A user's address (e.g., email address) can be unique to the user. For example, no two users may own the same address. In certain instances, two or more users may share the same address if credentials (e.g., password) are shared between the users. A server may deliver an online communication to one or more servers and/or one or more online accounts using the unique address.

In some instances, a recipient's online communication interface may be configured to enable a recipient to read the above information fields at a first glance before or after opening an email from an inbox. In other instances, the recipient's online communication interface (e.g., email interface) may be configured to enable a recipient to access or read one or more of the above information fields only by performing an additional action (e.g., clicking on a menu option, requesting such information from a mail server, etc.) after having opened the email.

However, in some cases, neither the sending mail server nor the receiving mail server can be capable of verifying (or have means to verify) the authenticity of one or more of the above information fields. In such cases, a user sending an email can take advantage of the lack of verification by providing fraudulent information to be presented for one or more of the information fields to the recipient. For example, the sender may freely select any name to display to the recipient (e.g., "FROM: John Smith" when the sender's real name is "John Doe"). In another example, the sender may freely select an email address of the sender and/or a return path email address to display to the recipient (e.g., "FROM: John Smith <john.smith@domain.com>" when the sender's real email address is "<john.doe@domain.com>"). That is, a sender may mask his or her real identity with another user's identity by masking a name and/or an email address. Using such methods, a first user may send an email on behalf of a second user's email address without the second user's permission. The sending mail server may perform no verification to ensure that the first user is authorized to send on behalf of the second user's email address. The receiving mail server may perform no verification to ensure that the email came from a user account having the second user's email address. A recipient may be especially susceptible to such fraudulent methods if the recipient is unaware that the sender has the freedom to mask a display name or a return path email address with another, which is often the case. For example, recipients may be led to believe, such as by lack of sufficient warnings by one or more mail servers, that any information provided by the recipient's mail server and/or mail server interface, including the sender's alleged display name and/or alleged return path email address, has been verified in some form by either the recipient's mail server or the sender's mail server.

Thus, a first user sender posing as a second user sender can defraud a third user recipient by creating an impression to the third user recipient that the second user has sent an email to the third user. For example, the first user can imitate or closely imitate a display name or email name of the second user (e.g., the first user sending an email with the name field "John Smith" and return email address field of "<john.smith@domain.co>," intending for the third user recipient to confuse the email to have come from the second user having the name "John Smith" and the email address "<john.smith@domain.com>"). In some cases, the first user can imitate a communication style of the second user, such as copying the second user's diction (e.g., opening statements, closing statements, disclaiming statements, shorthand habits, etc.) or writing format (e.g., how many spaces separate paragraphs, font, template, etc.).

In some cases, the first user can mask a display name and/or email address with the display name and/or email address of the second user, and send on behalf of the second user's email address, as described above (e.g., the first user sending with the return path email address of the second user's email address of "<john.smith@domain.com>" when the first user's real email address is "<john.doe@domain.com>"). In other cases, the first user can attach one or more forged or authentic files (e.g., documents, letters, signatures, etc.) to make the third user believe the email came from the second user. In any of the above cases, or with other scamming methods, the third user may find it difficult to recognize that it is not actually the second user sending the email. In the process, the third user may receive real and lasting damage from the communication by leaking personal and sensitive information or providing other assets of value to the first user or at the first user's instruction.

To prevent fraud, a user sending or receiving an email may resort to additional verification methods, including online (e.g., installing software or application modules configured to perform verification, providing a primary or secondary verification key (e.g, PIN code, passcode, one time password (OTP), etc.) unique to a user, providing a digital user identification certificate, etc.) and/or offline (e.g., manually verifying via a telephone call and verifying by voice, manually verifying in-person, etc.) methods. Oftentimes, manually verifying (e.g., via offline methods) an online communication to a sender or a recipient can be cumbersome, counteractive, inefficient, and/or time-consuming for users. Similarly, other methods of verification can require a separate installation of bulk (or add-on) software or a separate obtaining of a verification key or other digital certificate which can be bulky, cumbersome, inefficient, and/or time consuming for users. Verification systems and methods provided herein can be used alternatively or in addition to these verification processes. The systems and methods provided herein can facilitate verification of online communication to prevent attempts of fraud, such as fraud perpetuated via the methods described above, spoofing, scamming, phishing, and/or business email compromise (BEC).

When a sender sends an online communication, such as an email, to a recipient, the sender may wish to preemptively provide the recipient a verification of the sender's identity. For example, the sender may wish to provide the recipient a verification of his or her identity before the recipient makes such verification request. In some instances, the sender may wish to verify that an intended recipient received the online communication. In other instances, the recipient of an online communication may wish to verify that the online communication was sent from a trusted, known, and/or otherwise verified sender. Provided are systems and methods for verifying online communications that can (1) verify the identity of a sender of an online communication to a recipient; and/or (2) verify receipt of an online communication by an intended recipient to a sender.

Users may pre-register with a verification system, such as by creating an online account with the verification system. The verification system may or may not verify an identity of a user during registration. For example, the system may require in person certification. In some cases, the system may require provision of one or more supporting documents (e.g., passport, driver's license, photo identification card, etc.) either in person or via online transfer (e.g., as attachments in email, fax, etc.). In some cases, for in person verification, the system may require authentic documents or copies (e.g., photocopies, photos, etc.) of the authentic documents. In some cases, the system may use one or more other verification techniques as needed. The system may use a unique device identification (ID) or device identifier for a device owned by the user to verify the identity of the user. In some cases, the unique device ID can have been pre-associated with a verified user (e.g., by a device supplier, telecommunication provider, etc.). In some cases, an administrator of the system may deliver a device having a unique device ID (e.g., dongle, one-time password (OTP) generating device, etc.) to a user, such as via mail, and request the user to verify the user's identity with the delivered device.

Figure 3:
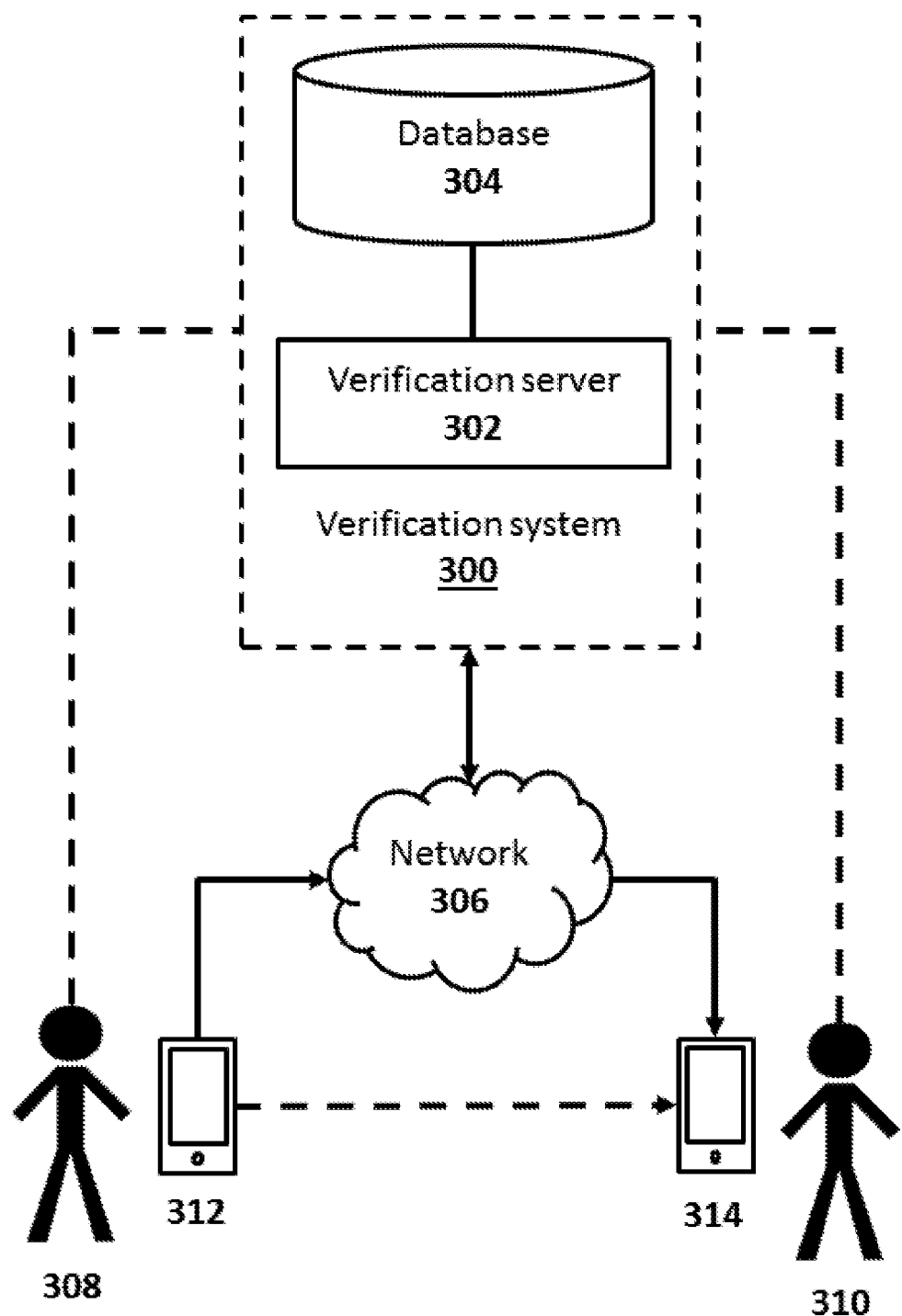
FIG. 3 shows a schematic diagram of an exemplary verification system facilitating a verification session of an online communication between two users.

For each registered user, the verification system may store one or more email addresses verified to be owned by the registered user, such as in a database (e.g., database 304 in FIG. 3). The verification system may only store an email address of a registered user if the registered user has verified the email address as the user's own to the verification system. For example, a user may verify an email address by successfully following instructions for verification in a confirmation email sent to that email address by the verification system (e.g., by a verification server of the verification system). Such instructions can include clicking on a unique confirmation link (e.g., URL) provided in the body of the email, re-entering a code or a password provided in the body of the email into another location (e.g., confirmation site), and/or any other instructions configured to uniquely verify a user. Alternatively or in addition, the verification system may further store other verified information of a user, such as a name, birth date, phone number, association to one or more organizations, position in one or more organizations, and/or other personal information. Such information can be verified accordingly by online or offline means (e.g., verifying copies of official documents, such as a passport, driver's license, business card, signed employment verification letter, text message to a provided phone number, etc.).

In some instances, the verification procedure can be more strict than the above (e.g., in person interview, etc.). For example, where an email address is associated with an organization (e.g., employees of an organization sharing a common organization domain of the email address), the verification system may require further proof of a user's association to the organization. For example, a user may be required to provide proof of employment, a copy of a business card, a copy of a membership card, a copy of a pay stub, a certified letter from a supervisor, or other proofs of association to an organization. In some instances, an organization subscribing to the services of the verification system may set its own verification procedure or standard with the verification system.

In some instances, a registered user may store only one verified email address. In other instances, a registered user may store more than one verified email address if the registered user can sufficiently prove ownership of each email address.

The verification system may thereafter access verified information of a registered user upon request by a sender and/or a recipient in relation to a particular instance of online communication to (1) confirm that the sender and/or the recipient is a registered user of the verification system, (2) verify that the sender and/or the recipient has sent and/or received, respectively, the particular instance of online communication, and (3) communicate the verification of the particular instance of online communication to the sender and/or the recipient.

FIG. 1A shows a process flow diagram of a verification session initiated by a sender. In FIG. 1A, the process(es) carried out by or involving a sender 102 is represented by a contact with a vertical line 150, the process(es) carried out by or involving a verification server 104 is represented by a contact with a vertical line 160, and the process(es) carried out by or involving an intended recipient 106 is represented by a contact with a vertical line 170.

The sender 102 can send 112A an email 108 to the intended recipient 106 by including an email address of the intended recipient as a recipient of the email. The sender may send the email with aid of a first user device, and the intended recipient may receive the email with aid of a second user device. User devices will be described in further detail below. The original email may be received directly by the intended recipient without going through a verification process. Simultaneously, the sender can initiate a verification session by sending 112B a verification request to the verification server 104. The sender can send a verification request to the verification server by including a verification request email address of the verification server (e.g., "verify@verificationserverdomain.com") as a recipient of the original email. For example, the sender may send the email to both an email address of the intended recipient and the verification request email address of the verification server to simultaneously send the email to the intended recipient and initiate the verification session.

Referring briefly to FIG. 1B, FIG. 1B shows an exemplary email 180 to be sent to a recipient by a sender. For example, the email 180 can be the same email 108 sent by the sender 102 to the recipient 106 in FIG. 1A. The sender may provide an email address (e.g., recipient@recipientmailserver.com) of an intended recipient in a "To" field 181 (as in FIG. 1B). Alternatively or in addition, the sender can provide the email address of the intended recipient in a "Carbon copy" (Cc) field 182, and/or a "Blind carbon copy" (Bcc) field 183. The sender may provide a subject of the email 180 (e.g., "URGENT—Wire Transfer Request") in a "Subject" field 184. The sender may provide a body of the email 180 (e.g., "Hi recipient, Hope you had a good weekend. This is an urgent request. Please process by 3 pm today. $xx, xxx.00 dollars to Client XYZ. Let me know if you have any questions.—Sender") in a "Content" field 185. The email 180 may or may not contain a verification request. The sender may include a verification request in the email 180 by providing a verification request email address of the verification server (e.g., server 104 in FIG. 1A) in the "Cc" field (as in FIG. 1B). Alternatively or in addition, the sender can provide the verification request email address in the "To" field and/or the Bcc field. The sender may further provide a respective email address (e.g., example@exampleserver.com) of one or more other recipients, such as in the "Bcc" field (as in FIG. 1B). Alternatively or in addition, the sender may provide the respective email address of the one or more other recipients in the "To" field and/or the "Bcc" field.

Referring back to FIG. 1A, the sender 102 can provide the email address of the intended recipient in the "To" field (e.g., "RCPT TO" field for a Simple Mail Transfer Protocol (SMTP) email transmission), "Cc" field, and/or a "Bcc" field of the email 108. The sender can provide the verification request email address in the "To" field, "Cc" field, and/or the "Bcc" field. In some instances, a recipient of the email 108 may not be able to view any email address in the Bcc field of the email 108. In some instances, the sender can provide a return path email address for the email 108. The return path email address can be the email address that a recipient of the email can reply to. In some instances, neither a mail server used by the sender to send the email nor a mail server used by the recipient to receive the email may be capable of verifying whether the sender has ownership of the return path email address.

Referring briefly to FIG. 1C, FIG. 1C shows an exemplary email 190 received by a recipient from a sender. For example, the email 190 can be the same email 108 sent by the sender 102 to the recipient 106 in FIG. 1A. The email 190 received by the recipient in FIG. 1C can be the same email 180 sent by the sender in FIG. 1B. The recipient may be provided with information provided by the sender in a "From" field 191, "To" field 192, "Cc" field 193, "Subject" field 194, and/or a "Content" field. In some instances, the recipient may not be provided with any information of email addresses or other recipients provided by the sender in the "Bcc" field. For example, the recipient may be able to see if the sender included a verification request in the email if the sender provided the verification request email address in the "To" field and/or the "Cc" field but not the "Bcc" field. The recipient may be provided with the "From" field. The "From" field may display a return path email address (e.g., sender@sendermailserver.com) of the sender. The "From" field may display a display name (e.g., "Sender") or user name of the sender. In some instances, the sender may have provided the return path email address and/or the display name. In some instances, the receiving mail server of the email 190 may not be capable of determining whether the sender had permission to send the email 190 on behalf of the return path email address. In some instances, the sending mail server of the email 190 may not be capable of determining whether the sender had permission to send the email 190 on behalf of the return path email address.

Referring back to FIG. 1A, the verification system can comprise one or more verification servers, including the verification server 104. The verification server 104 can be configured to receive any emails sent to the verification request email address. A receipt of an email 108 at the verification request email address can trigger a series or sequence of operations by the verification server. Upon receipt of the email, the server can verify 114 whether the owner of the return path email address of the email 108 is registered with the verification system. For example, the verification system may search in the server and/or a database of the server for whether the return path email address of the email 108 is stored in the verification system. As described above, the verification system may store or retain an email address of a user only if the user has registered with the verification system and has verified ownership of the email address. If the server determines that the return path email address is not preregistered with the verification system, the verification session can terminate at this point, and the intended recipient 106 will not receive a separate verification notice (e.g., verification email) from the verification server.

The lack of a verification notice can alert the recipient 106 that either the sender 102 did not initiate a verification request or the email 108 failed the verification request. Therefore, in some instances, the lack of a verification notice can be indicative that (1) the sender 102 is not a verified user of the verification system and/or (2) the email 108 was not sent by the user that owns the return path email address in the email 108 (e.g., sender 102 of the email 108 does not own the return path email address and is attempting fraud by masking the sender's own email address with another user's email address).

For example, if the sender 102 had visibly initiated the verification request, such as by sending the email 108 to the verification request email address in a "To" field or a "Cc" field which is visible to the intended recipient 106 receiving the email, such that the intended recipient is on notice that the verification request has been initiated by the sender, the lack of a separate verification notice can alert the intended recipient that the email has failed the verification request. Alternatively or in addition, if the sender had blindly initiated the verification request, such as by sending the email to the verification request email address in a "Bcc" field which is not visible to the intended recipient receiving the email, but the intended recipient had reason to know or believe that the user owning the return path email address can have initiated the verification request (e.g., as required by company policy, by user habit or user policy, by mail server default, etc.), the lack of a separate verification notice can alert the intended recipient that the email has failed the verification request. Similarly, if the sender had not initiated the verification request at all, and the intended recipient had reason to know or believe that a user having the return path email address otherwise can have initiated the verification request (e.g., as required by company policy, by user habit or user policy, by mail server default, etc.), the lack of a separate verification notice can alert the intended recipient that the email has failed the verification request or otherwise that the sender is a fraud.

If the server 104 determines that the return path email address of the email 108 is preregistered with the verification system, the verification server can then verify 116 whether the verified user having the return path email address in fact sent the email 108 to the intended recipient 106. That is, the server can determine whether the verified user is the sender 102 of the email 108. The server can send a confirmation email to the verified user's email registered with the verification system (which is also the return path email address in the email 108). For example, this confirmation process can filter out a fraudulent sender masking their actual email address with the verified user's email address and thus fraudulently sending on behalf of the verified user without the verified user's knowledge or permission. The fraudulent sender may not have access to the confirmation email because the fraudulent sender does not have access (e.g., password, credentials, etc.) to the verified user's email address. The confirmation email sent to the verified user by the server can include a copy of the original email 108. Alternatively, the confirmation email sent to the verified user by the server can include only one or more information fields of the original email 108, such as just a subject line of the original email, just a first sentence of the body of the original email, just the visible recipient fields (e.g., "To," "Cc," etc.), and/or a combination of one or more information fields.

Alternatively, in certain embodiments, the verification operation (e.g., 114) of the registration status of the return path email address of the email 108 may be skipped. Thus, regardless of whether an email address is pre-registered with the system or not, upon initiation of the verification request, the verification server can verify 116 whether the verified user having the return path email address in fact sent the email 108 to the intended recipient 106, such as by sending the confirmation email to the return path email address in the email 108. In such cases, the lack of a verification notice (received by the recipient 106) can be indicative that the email 108 was not sent by the user that owns the return path email address in the email 108 (e.g., sender 102 of the email 108 does not own the return path email address and is attempting fraud by masking the sender's own email address with another user's email address).

Upon receipt of the confirmation email, the verified user can verify 118, based on the information included with the confirmation email (e.g., copy of original email, one or more information fields of the original email, etc.), if the verified user is the sender 102 and in fact sent the email to the intended recipient 106. The confirmation email can comprise instructions for the verified user to indicate confirmation or denial as to sending the email 108. Thus if the verified user is the sender 102, the sender can verify having sent the email 108 to the intended recipient 106 by following the confirmation instructions. If the verified user is not the sender 102 (as the email 108 may claim to be), and the verified user cannot recall sending the first email, the verified user may deny having sent the email by following the denial instructions. Such instructions can include clicking on a unique confirmation link (e.g., URL), button, or hyperlink provided in the body of the confirmation email, re-entering a code or a password provided in the body of the confirmation email into another location (e.g., confirmation site provided by the verification server), and/or any other instructions configured to allow for unique verification or denial (e.g., scanning of a quick response (QR) code, etc.). In some instances, the verified user can have a finite time restraint to follow through with either instruction, wherein at an expiration of the finite time restraint, the verification system may automatically receive a denial indication. Alternatively, the verified user can have an infinite amount of time to follow through with the verification instructions.

Upon receiving the denial instruction from the verified user, the verification server 104 may terminate the verification session. In some instances, upon receiving the denial instructions, the server may alert the recipient 106 of a possible fraud attempt such as via a denial notification email. In some instances, the server may alert the verified user (e.g., owner of the return path email address of the email 108) of the possible fraud attempt. In some instances, upon receiving the denial instruction via time expiration, the server may alert the recipient 106 and/or the verified user that the verification session terminated due to expiration of time. In some instances, the verification server 104 may take no further action, and the recipient 106 may infer a complication in the verification from the lack of any notice.

If the verified user verifies that the verified user is the sender 102 and sent the email 108, the verification server 104 can thus receive 120 confirmation from the sender 102.

The verification server 104 can thereafter send 122 the intended recipient a verification notification, such as via a verification notification email. The verification notification email can explicitly display the verified email address of the sender 102 to the intended recipient 106 to provide transparency during the online communication. Advantageously, such increased transparency can aid users who use online communication systems (e.g., messaging systems, email systems, etc.), online communication platforms, and/or online communication interfaces (e.g., email inbox interfaces, etc.), that fail to explicitly display, or display with sufficient prominence (e.g., at first glance, with prominent font, etc.), a true source of an online communication, such as an email. Further, such increased transparency can aid users who use online communication systems that fail to perform their own verification methods, such as determining whether a sender has permission to send an online communication on behalf of a display name and/or a return path email address. By receiving the verification notice, the intended recipient 106 can be notified (1) that the sender 102 of the email 108 is a verified user registered with the verification system and/or (2) that the verified sender in fact sent the particular email 108.

Further, for the sender, the verification systems and methods provided herein may provide feedback to the sender that may allow the sender to see what was sent to which recipient.

In some instances, the sender 102 may have sent the email 108 to a wrong recipient.

In some instances, the verification notification email can further include instructions for the intended recipient 106 to provide acceptance or denial of the email 108. The intended recipient, having received verification of the authenticity of the sender 102's identity and the authenticity of the email via the verification notice, can accept 124 the email by following acceptance instructions. Alternatively, if a second recipient who is not the intended recipient received the email (e.g., because of clerical errors by the sender 102), the second recipient can deny acceptance of the email 108 by following denial instructions. In some instances, a recipient of the verification notification email can have a finite time restraint to follow through with either acceptance or denial instruction, wherein at an expiration of the finite time restraint, the verification system may automatically receive a denial indication. Alternatively, the recipient of the verification notification email can have an infinite amount of time to follow through with the acceptance or denial instructions.

Upon receiving the denial instruction from the recipient of the verification notification email, the verification server 104 may terminate the verification session. In some instances, upon receiving the denial instructions, the server may alert the sender 102 that the recipient has denied acceptance. In some instances, upon receiving the denial instruction via time expiration, the server may alert the sender and/or the recipient of the verification notification email that the verification session terminated due to expiration of time. Alternatively, the server may not send any notification to the sender 102 upon termination of the verification session (e.g., via expiration of time or affirmative denial). Thus, the sender 102 can be put on notice by a lack of acceptance notification that the email 108 may been sent to the wrong recipient.

If the intended recipient 106 accepts 124 the email 108, the verification server 104 can thus receive 126 confirmation that the intended recipient 106 received the email 108 from the sender 102.

The verification server 104 can thereafter send 128 the sender 102 an acceptance notification, such as via an acceptance notification email. The acceptance notification email can explicitly display the email address of the intended recipient 106. The email address of the intended recipient 106 has been verified by the server 104 via at least one round of successful communication back and forth (e.g., 122 and 126) between the server and the email address of the intended recipient, which successful communication proves that the intended recipient is capable of both receiving at and sending from the email address. Having received the acceptance notification, the sender 102 may be able to confirm that the email 108 was sent to the intended recipient and that the intended recipient safely received the email 108. If the intended recipient does not accept 124 the email, the sender may have an option to follow up with the intended recipient, such as through online (e.g., another email with a verification request) or offline methods (e.g., calling, talking, etc.). The verification session can terminate upon the sender 102 receiving confirmation that the recipient 106 has accepted the email 108.

In some instances, after receiving 126 confirmation that the intended recipient 106 accepted the email 108 and before sending 128 the verified sender 102 the acceptance notification email, the verification server 104 can further verify whether the intended recipient is registered with the verification system. For example, the verification system may search in the server and/or a database of the server for whether the email address of the intended recipient is stored in the verification system. As described above, the verification system may store or retain an email address of a user only if the user has registered with the verification system and has verified ownership of the email address. If the server determines that the intended recipient is not preregistered with the verification system, the verification session can terminate at this point, and the server will not send 128 the sender an acceptance notification. If the sender had reason to believe or know that the intended recipient is a verified user of the system and can have followed instructions to accept any email from the verification server (e.g., as required by company policy, by user habit or user policy, etc.), the lack of acceptance notification may alert the sender that the email 108 may have been sent to the wrong and/or an unverified recipient.

In some instances, after receiving 120 confirmation that the sender 102 sent the email 108 and before sending 122 the intended recipient 106 the verification notification email, the verification server 104 can further verify whether the intended recipient is registered with the verification system. For example, the verification system may search in the server and/or a database of the server for whether the email address of the intended recipient is stored in the verification system. As described above, the verification system may store or retain an email address of a user only if the user has registered with the verification system and has verified ownership of the email address. If the server determines that the intended recipient is not preregistered with the verification system, the verification session can terminate at this point, and the server will not send 122 the intended recipient a verification notification email. If the sender had reason to believe or know that the intended recipient is a verified user of the system and can have followed instructions to accept any email from the verification server (e.g., by company policy, etc.), the lack of acceptance notification (expected to come further along the verification session process) may alert the sender that the email 108 may have been sent to the wrong and/or an unverified recipient. The sender may follow up accordingly, such as by rechecking the recipient email address in the sent mail 108 and/or checking in with the intended recipient 106 via online or offline means.

Advantageously, through the verification system, a recipient receiving a verification notice shortly after receiving an email from a sender can be notified (1) that the sender of the email is a verified sender registered with the verification system and/or (2) that the verified sender in fact sent the particular email. A sender receiving an acceptance notice after having sent an email to an intended recipient can be notified (1) that the recipient of the email is a verified user registered with the verification system and/or (2) that the intended recipient in fact received the particular email.

Figure 2:
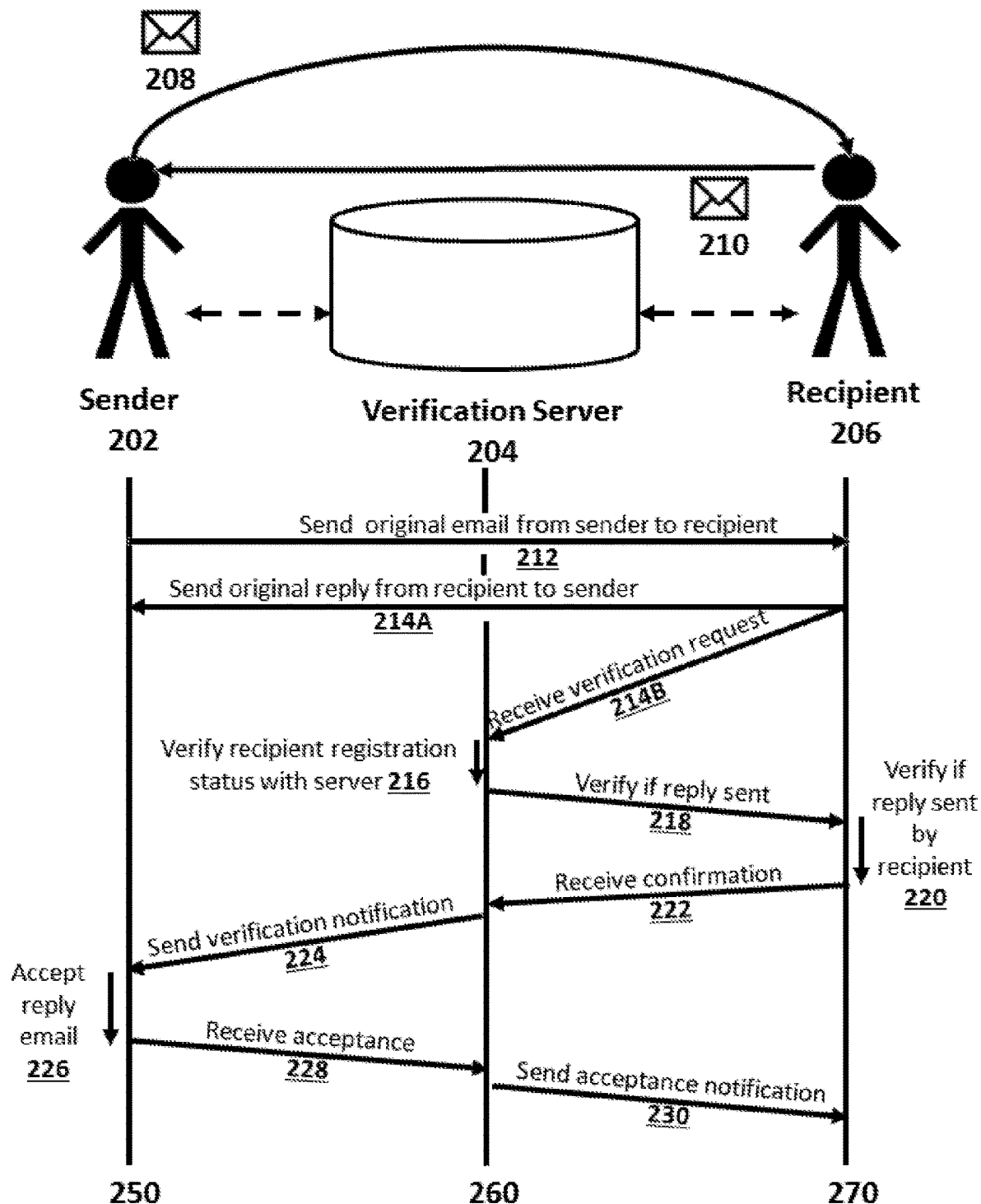
FIG. 2 shows a process flow diagram of a verification session initiated by a recipient.

FIG. 2 shows a process flow diagram of a verification session initiated by a recipient. In FIG. 2, the process(es) carried out by or involving a sender 202 is represented by a contact with a vertical line 250, the process(es) carried out by or involving a verification server 204 is represented by a contact with a vertical line 260, and the process(es) carried out by or involving an intended recipient 206 is represented by a contact with a vertical line 270.

The sender 202 can send 212 an email 208 to the intended recipient 206 by including an email address of the intended recipient as a recipient of the email 208. The sender may send the email with aid of a first user device, and the intended recipient may receive the email with aid of a second user device. User devices will be described in further detail below. The original email may be received directly by the intended recipient without going through a verification process.

The sender 202 may fail to simultaneously initiate a verification session (such as in FIG. 1) when sending the email 208. For example, the sender may have failed to initiate a verification session because the sender was aware of a verification system and/or a verification policy adopted by the sender and/or the sender's organization (e.g., business, group, association, etc.) but forgot. In another example, the sender may have failed to initiate a verification session because the sender had (or felt) no need to verify the authenticity of the particular email 208 to the intended recipient. In another example, a first sender may have failed to initiate a verification session because the first sender was unaware of a verification system and/or a verification policy adopted by another user and/or the other user's organization that the first sender is fraudulently copying or otherwise imitating. In such situations, the recipient 206 may initiate the verification session.

The recipient 206 can send 214A a reply email 210 to the email 208 back to a designated sender. The designated sender can be the user owning the return path email address in the email 208 received by the recipient. In some instance, the designated sender can be a different user than the sender 202 sending the email 208 to the recipient. The original reply email 210 may be received directly by the sender 202 without going through a verification process. In some instances, the original reply email 210 can include a copy of the original email 208 sent by the sender 202 to the recipient 206. Simultaneously with the reply email 210, the recipient can initiate a verification session by sending 214B a verification request to the verification server 204. The recipient can send a verification request to the verification server by including a verification request email address of the verification server (e.g., "verify@verificationserverdomain.com") as a recipient of the reply email 210. For example, the recipient may send the reply email to both an email address of the designated sender and the verification request email address of the verification server to simultaneously send the email to the designated sender and initiate the verification session.

The recipient 206 can provide the verification email address in the "To" field (e.g., "RCPT TO" field for a Simple Mail Transfer Protocol (SMTP) email transmission), "Carbon Copy (Cc)" field, and/or a "Blind Carbon Copy (Bcc)" field of the reply email 210.

In some instances, the verification session initiated by the recipient 206 for the reply email 210 to the email 208 (in FIG. 2) can parallel the verification session initiated by the sender 102 for the email 108 (in FIG. 1), unless otherwise distinguished in the descriptions herein. For example, the verification server 104 of FIG. 1 can be the same verification server 204 of FIG. 2.

The verification system can comprise one or more verification servers, including the verification server 204. The verification server 204 can be configured to receive any emails sent to the verification request email address. A receipt of any email (e.g., original email 108 from sender in FIG. 1, reply email 210 from recipient in FIG. 2, etc.) at the verification request email address can trigger a series of operations by the verification server. Upon receipt of the reply email 210, the server can verify 216 whether the recipient 206 is registered with the verification system. For example, the verification system may search in the server and/or a database of the server for whether a return path email address of the reply email 210 is stored in the verification system. As described above, the verification system may store or retain an email address of a user only if the user has registered with the verification system and has verified ownership of the email address. If the server determines that the recipient is not preregistered with the verification system, the verification session can terminate at this point, and the sender 202 will not receive a verification notice (e.g., verification email) from the verification server.

The lack of a verification notice can alert the sender 202 that either the recipient 206 did not initiate a verification request or the reply email 210 failed the verification request. Therefore, in some instances, the lack of a verification notice can be indicative that (1) the recipient 206 is not a verified user of the verification system and/or (2) the reply email 210 was not sent by the user that owns the return path email address in the reply email 210 (e.g., a third user is attempting fraud by masking the third user's own email address with another user's email address). For example, if a first email by a first user to a second user was forwarded initially by the second user to one or more users (consecutively) to reach an inbox of a third user such that the third user obtains a copy of the first email or the third user is otherwise able to extract a copy of the first email (such as from an attachment), the third user may use the copy of the first email to send a "reply email" to the first user and mask the third user's own email address with the second user's email address by providing the second user's email address as the return path email address of the "reply email." The first user receiving the "reply email" and seeing the second user's email address in the return path email address of the "reply email" may be induced to believe that the "reply email" was sent by the second user and follow one or more instructions in the "reply email' that can harm the first user, such as financially or personally.

For example, if the recipient 206 had visibly initiated the verification request, such as by sending the reply email 210 to the verification request email address in a "To" field or a "Cc" field which is visible to the sender 202 receiving the reply email, such that the sender is on notice that the verification request has been initiated by the recipient, the lack of a separate verification notice can alert the sender that the reply email has failed the verification request. Alternatively or in addition, if the recipient had blindly initiated the verification request, such as by sending the reply email to the verification request email address in a "Bcc" field which is not visible to the sender receiving the reply email, but the sender had reason to know or believe that the recipient can have initiated the verification request (e.g., as required by company policy, by mail server default, etc.), the lack of a separate verification notice can alert the sender that the reply email has failed the verification request. Similarly, if the recipient had not initiated the verification request, and the sender had reason to know or believe that the recipient can have initiated the verification request (e.g., as required by company policy, by mail server default, etc.), the lack of a separate verification notice can alert the sender that the reply email has failed the verification request or otherwise that the reply email is a fraud.

If the server 204 determines that the return path email address of the reply email 210 is preregistered with the verification system, the verification server can then verify 218 whether the verified user having the return path email address of the reply email in fact sent the reply email to the sender 202. That is, the server can determine whether the recipient 206 owns the verified email address. The server can send a confirmation email to the verified user's email registered with the verification system (which is also the return path email address in the reply email 210). For example, this confirmation process can filter out a fraudulent user masking their actual email address with the verified user's email address and thus fraudulently sending on behalf of the verified user without the verified user's knowledge or permission. The fraudulent user may not have access to the confirmation email because the fraudulent user does not have access (e.g., password, credentials, etc.) to the verified user's email address. The confirmation email sent to the verified user by the server can include a copy of the original reply email 210. In some instances, the confirmation email sent to the verified user by the server can additionally include a copy of the original email 208. Alternatively, the confirmation email sent to the verified user by the server can include only one or more information fields of the original reply email, such as just a subject line of the original reply email, just a first sentence of the body of the original reply email, just the visible recipient fields (e.g., "To," "Cc," etc.) of the original reply email, and/or a combination of one or more information fields.

The verified user can verify 220, based on this information (e.g., copy of original reply email, one or more information fields of the original reply email, etc.), if the verified user in fact has sent the reply email 210 to the sender 202. The confirmation email can comprise instructions for the verified user receiving the confirmation email to indicate confirmation or denial as to sending the reply email 210.

Thus if the verified user is the recipient 206, the recipient can verify having sent the reply email 210 to the sender 202 by following the confirmation instructions. If the verified user is not the recipient 206 (as the reply email 210 may claim to be), and the verified user cannot recall sending the reply email, the verified user may deny having sent the reply email by following the denial instructions. Such instructions can include clicking on a unique confirmation link (e.g., URL), button, or hyperlink provided in the body of the confirmation email, re-entering a code or a password provided in the body of the confirmation email into another location (e.g., confirmation site provided by the verification server), and/or any other instructions configured to allow for unique verification or denial. In some instances, the verified user can have a finite time restraint to follow through with either instruction, wherein at an expiration of the finite time restraint, the verification system may automatically receive a denial indication. Alternatively, the verified user can have an infinite amount of time to follow through with the verification instructions.

Upon receiving the denial instruction from the verified user, the verification server 104 may terminate the verification session. In some instances, upon receiving the denial instructions, the server may alert the sender 202 of a possible fraud attempt such as via a denial notification email. In some instances, the server may alert the verified user (e.g., owner of the return path email address of the reply email 210) of the possible fraud attempt. In some instances, upon receiving the denial instruction via time expiration, the server may alert the sender 202 and/or the verified user that the verification session terminated due to expiration of time.

If the verified user verifies that the verified user is the recipient 206 and sent the reply email 210, the verification server 204 can thus receive 222 confirmation from the recipient 206.

The verification server 204 can thereafter send 224 the sender 202 a verification notification, such as a verification notification email. The verification notification email can explicitly display the verified email address of the verified recipient 206 to the sender 202 to provide transparency during the online communication. By receiving the verification notice, the sender 202 can be notified (1) that the recipient 206 is a verified user registered with the verification system and (2) that the verified recipient in fact sent the particular reply email. The sender may further be able to confirm that the original email 208 was sent to the intended (or correct) recipient.

In some instances, a fraudulent user may have sent the original email 208 to the recipient. For example, the fraudulent user may have provided a return path email address in the original email 208 that is very close to a verified email address of a verified sender (e.g., one character difference in respective email addresses, etc.). In another example, the fraudulent user may have provided a verified email address of a verified sender as the return path email address, taking advantage of the fact that some mail servers are not capable of verifying whether a sender of an email owns the return path email address provided in the email. In some instances, the recipient may have sent the reply email 210 to a wrong user (e.g., not the sender 202).

In some instances, the verification notification email can further include instructions for the sender 202 to provide acceptance or denial of the reply email 210. The instructions for acceptance or denial can be the same or different instructions to verify 220 or deny sending of the reply email by the recipient, such as described above. The sender, having received verification of the authenticity of the recipient 206's identity and the authenticity of the reply email via the verification notice, can accept 226 the reply email by following acceptance instructions.

Alternatively, if a user who is not the intended recipient (e.g., not the sender 202) of the reply email received the reply email (e.g., because of clerical errors by the recipient 206), the user can deny acceptance of the reply email 210 by following denial instructions. In another example, if a second user whose identity was stolen by a third user (e.g., third user sends the original email 208 to the recipient 206 on behalf of the second user without the second user's permission by providing the second user's email address as the return path email address in the original email 208) receives the reply email 210, and the second user does not recognize having sent the original email 208 to which the reply email 210 is directed to, the second user may deny acceptance of the reply email 210 by following denial instructions.

In some instances, a recipient of the verification notification email can have a finite time restraint to follow through with either acceptance or denial instruction, wherein at an expiration of the finite time restraint, the verification system may automatically receive a denial indication. Alternatively, the recipient of the verification notification email can have an infinite amount of time to follow through with the acceptance or denial instructions.

Upon receiving the denial instruction from the recipient of the verification notification email, the verification server 204 may terminate the verification session. In some instances, upon receiving the denial instructions, the server may alert the recipient 206 that the recipient of the reply email 210 has denied acceptance. In some instances, the recipient 206 may deduce one of the above scenarios (e.g., reply email sent to wrong user, original email sent by fraudulent user, etc.) from being alerted of the denied acceptance or from a lack of acceptance notice. In some instances, upon receiving the denial instruction via time expiration, the server may alert the recipient 206 and/or the recipient of the verification notification email that the verification session terminated due to expiration of time. Alternatively, the server may not send any notification to the recipient 206 upon termination of the verification session (e.g., via expiration of time or affirmative denial).

If the sender 202 accepts 226 the reply email 210, the verification server 204 can thus receive 228 confirmation that the sender 202 received the reply email 210 from the recipient 206.

The verification server 204 can thereafter send 230 the recipient 206 an acceptance notification, such as via an acceptance notification email. The acceptance notification email can explicitly display the email address of the sender 202. The email address of the sender 202 has been verified by the server 204 via at least one round of successful communication back and forth (e.g., 224 and 228) between the server and the email address of the sender, which successful communication proves that the sender is capable of both receiving at and sending from the email address. Having received the acceptance notification, the recipient 206 may be able to confirm that the sender safely received the reply email 210. In some instances, the verified recipient may further be able to confirm that the sender 202 owns the return path email address of the original email 208 sent by the sender 202 to the recipient 206, which original email that the recipient replied to with the reply email 210. Such ownership can be confirmed by the explicit display of the email address of the sender 202 in the acceptance notification email. In some instances, the recipient 206 may further be able to deduce that the sender 202 sent the original email 208.

On the other hand, if the sender 202 does not accept the reply email 210, the server 204 may not send the acceptance notification. For example, the sender 202 may refuse to accept the reply email 210 if the sender does not recognize sending the original email 208 to which the reply email is replying to. Thus, the lack of an acceptance notification may alert the recipient 206 that the original email 208 to which the recipient replied to may have been sent on behalf of the sender 202 without the sender's permission. Put on notice by the lack of the acceptance notification, the recipient 206 may have the option to follow up with the sender 202, such as through online (e.g., another email with a verification request) or offline means (e.g., calling, talking, etc.).

The verification session can terminate upon the recipient 206 receiving confirmation that the sender 202 has accepted the reply email 210.

In some instances, after receiving 228 confirmation that the sender 202 received the reply email 210 and before sending 230 the recipient 206 the acceptance notification email, the verification server 204 can further verify whether the sender 202 is registered with the verification system. For example, the verification system may search in the server and/or a database of the server for whether the email address of the sender is stored in the verification system. As described above, the verification system may store or retain an email address of a user only if the user has registered with the verification system and has verified ownership of the email address. If the server determines that the sender is not preregistered with the verification system, the verification session can terminate at this point, and the server will not send 230 the verified recipient an acceptance notification. If the recipient had reason to believe or know that the sender is a verified user of the system and can have followed instructions to accept any email from the verification server (e.g., as required by company policy, by user habit or user policy, etc.), the lack of acceptance notification may alert the recipient that the reply email may have been sent to the wrong and/or an unverified user. Thus, the lack of an acceptance notification may alert the recipient that the original email 208 to which the recipient replied to was sent by (1) an unverified user, and/or (2) on behalf of a verified user but without the verified user's permission, either or both of which can prompt the recipient 206 to take additional measures to follow-up on the original email 208 with the sender 202 through offline or online means.

In some instances, after receiving 222 confirmation that the recipient 206 sent the reply email 210 and before sending 224 the sender 202 the verification notification email, the verification server 204 can further verify whether the sender is registered with the verification system. For example, the verification system may search in the server and/or a database of the server for whether the email address of the sender is stored in the verification system. As described above, the verification system may store or retain an email address of a user only if the user has registered with the verification system and has verified ownership of the email address. If the server determines that the sender is not preregistered with the verification system, the verification session can terminate at this point, and the server will not send 224 the sender a verification notification email. If the recipient had reason to believe or know that the sender is a verified user of the system and can have followed instructions to accept any email from the verification server (e.g., as required by company policy, user habit or user policy, etc.), the lack of acceptance notification may alert the recipient that the reply email 210 may have been sent to the wrong and/or an unverified user. Thus, the lack of an acceptance notification may alert the recipient 206 that the original email 208 to which the recipient replied to was sent by (1) an unverified user, and/or (2) on behalf of a verified user but without the verified user's permission, either or both of which can prompt the recipient to take additional measures to follow-up on the original email 208 with the sender 202 through offline or online means.

Advantageously, through the verification system, a sender receiving a verification notice shortly after receiving a reply email from a recipient can be notified (1) that the recipient is a verified user registered with the verification system and/or (2) that the verified recipient in fact sent the particular reply email to the sender. A recipient receiving an acceptance notice after having sent a reply email to a sender can be notified (1) that the sender is a verified user registered with the verification system and/or (2) that the verified sender in fact received the particular reply email. Further, the recipient, by being able to initiate the verification request through a reply email to an original email, which original email claims to be sent from a first sender to the recipient, may verify whether (1) the first sender is a verified user registered with the verification system, (2) the first sender in fact owns the return path email address of the original email, and/or (3) the first sender in fact sent the original email to the recipient.

FIG. 3 shows a schematic diagram of an exemplary verification system facilitating a verification session of an online communication between two users. The verification system 300 can comprise a verification server 302 and a database 304 communicatively coupled to the verification server. The verification system and/or the verification server ay comprise a communications interface. The verification system via the communications interface, a first user 308 via a first user device 312, and a second user 310 via a second user device 314 can communicate with each other via a network 306. The first user 308 may or may not be preregistered to the verification system. The second user 310 may or may not be preregistered to the verification system.

While only one of each component is shown in FIG. 3, the system 300 may comprise a plurality of each component. For example, the system may comprise a plurality of verification servers. Each of the plurality of verification servers can be the same as or different from the verification server 302. Each of the plurality of verification servers can be located in the same location as or be remote from the verification server 302. For example, the system may comprise a plurality of databases. Each of the plurality of databases can be the same as or different from the database 304. Each of the plurality of databases can be located in the same location as or be remote from the database 304.

The first user 308, via the first user device 312, may send the second user 310 an online communication in the form of a first email. When sending the first email, the first user may provide both an email address of the second user and a return path email address of the first email. The first user may or may not own the return path email address of the first email. Neither the sending mail server nor the receiving mail server may be capable of verifying whether the first user owns the return path email address of the first email. An original copy of the first email can be received by the second user without going through any verification process. In some instances, when sending the email, the first user may simultaneously initiate a verification session by sending the first email to both an email address of the second user and a verification request email address of the verification server 302.

The second user 310 may receive and access the first email via the second user device 314. In some instances, the second user may reply to the first user's first email in the form of a second email. In some instances, the second email can include a copy of the first email or a copy of at least a portion thereof. When sending the second email, the second user may provide both an email address of the first user 308 (which is typically taken to be the return path email address of the first email) and a return path email address of the second email. The second user may or may not own the return path email address of the second email. Neither the sending mail server nor the receiving mail server may be capable of verifying whether the second user owns the return path email address of the second email. An original copy of the second email can be received by the first user without going through any verification process. In some instances, when sending the second email, the second user may simultaneously initiate a verification session by sending the second email to both an email address of the first user (which is typically taken to be the return path email address of the first email) and a verification request email address of the verification server 302.

A verification session can be hosted by a verification server 302 of the verification system 300.

The first user device 312 and the second user device 314 may be a mobile device (e.g., smartphone, tablet, pager, personal digital assistant (PDA)), a computer (e.g., laptop computer, desktop computer, server), or a wearable device (e.g., smartwatches). A user device can also include any other media content player, for example, a set-top box, a television set, a video game system, or any electronic device capable of providing or rendering data. The user device may optionally be portable. The user device may be handheld. The user device may be a network device capable of connecting to a network, such as the network 306, or other networks such as a local area network (LAN), wide area network (WAN) such as the Internet, a telecommunications network, a data network, or any other type of network.

The user devices 312, 314 may each comprise memory storage units which may comprise non-transitory computer readable medium comprising code, logic, or instructions for performing one or more steps. A user device may comprise one or more processors capable of executing one or more steps, for instance in accordance with the non-transitory computer readable media. The user device may comprise a display showing a graphical user interface. The user device may be capable of accepting inputs via a user interactive device. Examples of such user interactive devices may include a keyboard, button, mouse, touchscreen, touchpad, joystick, trackball, camera, microphone, motion sensor, heat sensor, inertial sensor, or any other type of user interactive device. The user device may be capable of executing software or applications provided by one or more verification systems. One or more applications may or may not be related to sending and receiving emails. A user device can be capable of sending emails and/or receiving emails. A user device can be capable of supporting an online communication interface (e.g., email interface, online mail interface, inbox/outbox interface, messaging interface, chatting interface, etc.).

The user device may be, for example, one or more computing devices configured to perform one or more operations consistent with the disclosed embodiments. In some instances, the software and/or applications may allow the users 308, 310 to register with a verification system 300, access one or more emails, send an email, receive an email, confirm sending an email, and/or confirm receiving an email during a verification session.

A verification server 302, at the request of a user (e.g., first user 308, second user 310, etc.), may start a verification session in the verification system 300. A server, as the term is used herein, may refer generally to a multi-user computer that provides a service (e.g. verification) or resources (e.g. file space) over a network connection. The server may be provided or administered by an online service provider. In some cases, the server may be provided or administered by a third party entity in connection with a device provider. While only one server is shown in FIG. 3, one or more servers can collectively or individually perform the operations of the server 302 disclosed herein. In some instances, the server may include a web server, an enterprise server, or any other type of computer server, and can be computer-programmed to accept requests (e.g., HTTP, or other protocols that can initiate data transmission) from a computing device (e.g., a user device, a public share device) and to serve the computing device with requested data. In addition, the server can be a broadcasting facility, such as free-to-air, cable, satellite, and other broadcasting facility, for distributing data. The server may also be a server in a data network (e.g., a cloud computing network). In some embodiments, the online service provider of the verification system may administer one or more servers to provide various services to users of the system, such as allowing users to register (e.g., create an online account) with the online service provider and store one or more verified email addresses of each user.

The verification server 302 may comprise one or more verification request email addresses. Any email sent to the one or more verification request email addresses may automatically trigger a sequence of operations by the verification server 302 (such as). In some instances, an administrator of the verification system may manually read a given email sent to the one or more verification request email addresses in an mail inbox of the verification server and manually carry out one or more of the processes described herein (e.g., the processes described in relation to FIGS. 1 and 2).

For example, the verification server 302 may be configured to, upon receiving the first email from the first user 308, start a verification session. The verification server may be configured to compare the return path email address of the first email to each of the email addresses of all registered users of the verification system 300 to determine whether the return path email address of the first email belongs to a registered (verified) user of the verification system. If the return path email address of the first email is not stored in the system (and thus not verified by any verified user of the system), the server can be configured to terminate the session. Alternatively, if the return path email address of the first email is stored in the system (and thus has been verified by a verified user of the system), the server can be configured to send a verification email to the return path email address of the first email to verify whether the first user owns the return path email address of the first email and/or whether the first user in fact sent the first email to the second user.

The verification email can comprise an original copy of the first email and/or at least some content or information field of the first email, such as a subject line of the first email. The verification email can comprise instructions for the recipient of the verification email to indicate confirmation or denial as to sending the first email. Thus if the recipient of the verification email is the first user 308, the first user can verify having sent the first email by following the confirmation instructions. If the recipient of the verification email is not the first user, and the recipient of the verification email cannot recall sending the first email, the recipient of the verification email may deny having sent the first email by following the denial instructions. Examples of the confirmation or denial instructions are described above (e.g., confirmation links, buttons, etc.). In some instances, the recipient of the verification email can have a finite time restraint to follow through with either instruction, wherein at an expiration of the finite time restraint, the verification system may automatically receive a denial indication. Alternatively, the recipient of the verification email can have an infinite amount of time to follow through with the verification instructions.

Upon receiving the denial instruction from the recipient of the verification email, the verification server 302 may terminate the session. In some instances, upon receiving the denial instructions, the server may alert the second user 310 of a possible fraud attempt such as via a denial notification email. In some instances, the server may alert the owner of the return path email address of the first email of the possible fraud attempt. In some instances, upon receiving the denial instruction via time expiration, the server may alert the second user and/or the recipient of the verification email that the verification session terminated due to expiration of time. Alternatively, the server may not send the second user any notifications if the recipient of the verification email does not confirm. In some instances, a lack of verification notification can alert the second user that the first user is not a verified user of the verification system and/or that the first email has failed verification.

If the recipient of the verification email is the first user 308, and the first user verifies having sent the first email, the server 302 can receive this verification and thereafter send the second user 310 a verification notification, such as via a verification notification email. The verification notification email can explicitly display the return path email address of the first email. The verification email can comprise instructions for the second user 310 to indicate acceptance or denial as to receiving the first email. If the second user does not believe the second user should have received the first email, the second user can deny acceptance by following the denial instructions. The server can terminate the verification session upon receiving the denial instructions and not send any acceptance notification to the first user. Alternatively, the second user may accept the first email by following the acceptance instructions. The server can receive the acceptance and thereafter send the first user an acceptance notification, such as via an acceptance notification email. The acceptance notification email can explicitly display the email address of the second user.

In some instances, upon receiving denial instructions regarding acceptance of the first email from the second user 310, the server may alert the first user 308 that the second user has denied acceptance. Alternatively, the server may not send the first user any notifications if the recipient of the verification notification email does not accept. In some instances, a lack of acceptance notification can alert the first user that the first email may have been sent to the wrong recipient.

In some instances, any time after the server 302 receives confirmation of sending of the first email from the first user 308 and before the server sends acceptance notification (e.g., by the second user 310) to the first user, the server may verify whether the second user is a verified (or registered) user of the verification system. If the server determines that the second user is not a registered user of the system, the server may terminate the verification session and either not send the verification notification email to the second user or not send the acceptance notification to the first user or both. In such a case, the first user not receiving an acceptance notification, but having reason to believe or know that the intended recipient of the first email can have accepted the first email (e.g., by company policy, mail server default, etc.), may be alerted that the first email was sent to the wrong recipient.

Through the verification session of the first email, the second user receiving the first email from the first user may be able to verify (1) whether the first user is a verified (or registered) user of the verification system, and/or (2) whether the first user in fact sent the first email. Through the verification session of the first email, the first user sending the first email may be able to verify (1) whether the second user is a verified (or registered) user of the verification system, and/or (2) whether the second user safely received the first email.

In another example, the verification server 302 may be configured to, upon receiving the second email from the second user 310, start a verification session. The verification server may be configured to compare the return path email address of the second email to each of the email addresses of all registered users of the verification system 300 to determine whether the return path email address of the second email belongs to a registered (verified) user of the verification system. If the return path email address of the second email is not stored in the system (and thus not verified by any verified user of the system), the server can be configured to terminate the session. Alternatively, if the return path email address of the second email is stored in the system (and thus has been verified by a verified user of the system), the server can be configured to send a verification email to the return path email address of the second email to verify whether the second user owns the return path email address of the second email and/or whether the second user in fact sent the second email to the first user.

The verification email can comprise a copy of the second email and/or at least some content or information field of the second email, such as a subject line of the second email. In some instances, the verification email can comprise a copy of the first email to which the second email is replying to, or at least a portion thereof. The verification email can comprise instructions for the recipient of the verification email to indicate confirmation or denial as to sending the second email. Thus if the recipient of the verification email is the second user 310, the second user can verify having sent the second email by following the confirmation instructions. If the recipient of the verification email is not the second user, and the recipient of the verification email cannot recall sending the second email, the recipient of the verification email may deny having sent the second email by following the denial instructions (or alternatively not confirmation instructions). Examples of the confirmation or denial instructions are described above (e.g., confirmation links, buttons, etc.). In some instances, the recipient of the verification email can have a finite time restraint to follow through with either instruction, wherein at an expiration of the finite time restraint, the verification system may automatically receive a denial indication. Alternatively, the recipient of the verification email can have an infinite amount of time to follow through with the verification instructions.

Upon receiving the denial instruction from the recipient of the verification email, the verification server 302 may terminate the session. In some instances, upon receiving the denial instructions, the server may alert the first user 308 of a possible fraud attempt such as via a denial notification email. In some instances, the server may alert the owner of the return path email address of the second email of the possible fraud attempt. In some instances, upon receiving the denial instruction via time expiration, the server may alert the first user and/or the recipient of the verification email that the verification session terminated due to expiration of time. Alternatively, the server may not send the first user any notifications if the recipient of the verification email does not confirm. In some instances, a lack of verification notification can alert the first user that the second user is not a verified user of the verification system and/or that the second email has failed verification.

If the recipient of the verification email is the second user 310, and the second user verifies having sent the second email, the server 302 can receive this verification and thereafter send the first user 308 a verification notification, such as via a verification notification email. The verification notification email can explicitly display the return path email address of the second email. The verification email can comprise instructions for the first user 308 to indicate acceptance or denial as to receiving the second email. If the first user does not believe the first user should have received the second email, the first user can deny acceptance by following the denial instructions. The server can terminate the verification session upon receiving the denial instructions and not send any acceptance notification to the second user. Alternatively, the first user may accept the second email by following the acceptance instructions. The server can receive the acceptance and thereafter send the second user an acceptance notification, such as via an acceptance notification email. The acceptance notification email can explicitly display the email address of the first user.

In some instances, upon receiving denial instructions regarding acceptance of the second email from the first user 308, the server may alert the second user 310 that the first user has denied acceptance. Alternatively, the server may not send the second user any notifications if the recipient of the verification notification email does not accept. In some instances, a lack of acceptance notification can alert the second user that the second email may have been sent to the wrong recipient.

In some instances, any time after the server 302 receives confirmation of sending of the second email from the second user 310 and before the server sends acceptance notification (e.g., by the first user 308) to the second user, the server may verify whether the first user is a verified (or registered) user of the verification system. If the server determines that the first user is not a registered user of the system, the server may terminate the verification session and either not send the verification notification email to the first user or not send the acceptance notification to the second user or both. In such a case, the second user not receiving an acceptance notification, but having reason to believe or know that the intended recipient of the second email can have accepted the second email (e.g., by company policy, mail server default, etc.), may be alerted that the second email was sent to the wrong recipient. In some instances, the first user may not accept the second email if the first user does not recall sending the first email to which the second email is replying to. In such a case, the second user not receiving an acceptance notification may be alerted that the first email was sent from a fraudulent user.

Through the verification session of the second email, the first user receiving the second email from the second user may be able to verify (1) whether the second user is a verified (or registered) user of the verification system, and/or (2) whether the second user in fact sent the second email. Through the verification session of the second email, the second user sending the second email may be able to verify (1) whether the first user is a verified (or registered) user of the verification system, and/or (2) whether the first user safely received the second email. In some instances, the second user may be able to further verify through the verification session of the second email whether (1) the first user in fact owns the return path email address of the first email, and/or (2) the first user in fact sent the first email to the second user.

While FIG. 3 illustrates a verification session between two users, the first user 308 and the second user 310 in accordance with the verification system 300, the verification system can support a verification session between any two users. The any two users may or may not be registered with the system. Each user may access or communicate with the verification system via a network 306 with aid of a user device.

In some instances, in accordance with the system 300, the verification session can be between more than two users, such as 3 users, 4 users, 5 users, 6 users, 7 users, 8 users, 9 users, or more users. For example, a first user sending a first email to 3 different users, including a second user, a third user, and a fourth user, can initiate a verification request with the system by sending the first email to each of the email addresses of the 3 different users as well as the verification request email address of the verification server 302. In some instances, upon receiving the first email, the server may initiate an independent verification session between the first user and each recipient user such that three verification sessions are performed in parallel, a first session between the first user and the second user, a second session between the first user and the third user, and a third session between the first user and the fourth user.

Each verification session may independently perform the same set of operations performed by each of the verification sessions described above (e.g., in FIGS. 1 and 2) to yield the same or different verification outcomes. For example, the first user may receive acceptance notification emails for the respective sessions with the third user and the fourth user but no acceptance notice for the session with the second user. In some instances, one or more processes or operations repeated by (or overlapped by) each parallel verification session can be consolidated such that the one or more processes or operations are performed only once by the first user, the server, and/or each of the recipients. For example, the server may consolidate the operation of verifying the first user's registration status with the system for the three verification sessions and verify the first user's registration status only once. This may beneficially save limited processing capacity of the verification server. In another example, upon verification of the first user's registration status with the system, the server may consolidate the verification or confirmation email sent to the first user for the three verification sessions such that the first user need only confirm once that the first user sent the first email to the three users. The first user's single confirmation of sending the first email can be applied independently to each of the three verification sessions, and the server may thereafter send separate verification notification emails to each of the three recipient users.

In the schematic illustration of FIG. 3, two-way data transfer capability may be provided between any two components, including the first user device 312 and the second user device 314, the first user device 312 and the verification system 300, the first user device 312 and the verification server 302, the first user device 312 and the database 304, the verification system 300 and the verification server 302, the verification system 300 and the database 304, the verification server 302 and the database 304, the network 306 and any component, and the second user device 314 and any component.

The network 306 may be configured to provide communication between various components of the network layout depicted in FIG. 3. The network 306 may comprise one or more networks that connect devices and/or components in the network layout to allow communication between the devices and/or components. For example, the network may be implemented as the Internet, a wireless network, a wired network, a local area network (LAN), a Wide Area Network (WANs), Bluetooth, Near Field Communication (NFC), or any other type of network that provides communications between one or more components of the network layout. In some embodiments, the network may be implemented using cell and/or pager networks, satellite, licensed radio, or a combination of licensed and unlicensed radio. The network may be wireless, wired (e.g., Ethernet), or a combination thereof.

The server 302 can be configured to implement the operations described above and further below. For example, the server 302 can be configured to receive and process verification requests, start and terminate a verification session, receive and send emails to registered and/or nonregistered users of the verification system, generate confirmation and/or denial instructions (e.g., confirmation links, buttons, etc.) in a body of an email, process confirmation and/or denial instructions from registered and/or nonregistered users of the system, determine a registration status of a user with the system, determine a registration status of an email within the system, track the respective and sequential verification, acceptance, confirmation, and/or denial statuses between at least two users in a verification session (such as by temporarily or permanently storing a process flow of each verification session in the database 304), and/or other operations described herein.

The verification server 302 may comprise known computing components, such as one or more processors, one or more memory devices storing software instructions executed by the processor(s), and data. The server can have one or more processors and at least one memory for storing program instructions. The one or more processors can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), an MO (magneto-optical), a DVD-ROM (digital versatile disk-read only memory), a DVD RAM (digital versatile disk-random access memory), or a semiconductor memory. Alternatively, the methods disclosed herein can be implemented in hardware components or combinations of hardware and software such as, for example, ASICs (application specific integrated circuits), special purpose computers, or general purpose computers. While FIG. 3 illustrates the verification server 302 as a single server, in some embodiments, multiple devices may implement the functionality associated with the verification server 302. While FIG. 3 illustrates the verification system 300 as a single system, in some embodiments, multiple verification systems may implement the functionality associated with the verification system 300.

The verification system 300 may be implemented as one or more computers storing instructions that, when executed by one or more processors, can initiate, process, and/or terminate one or more verification sessions, such as by performing the operations and steps described herein. In some instances, the server 302 may comprise the computer in which the verification system is implemented. Alternatively, the verification system may be implemented on separate computers.

In certain configurations, the system 300 may be a software stored in memory accessible by the server 302 (e.g., in a memory local to the server or remote memory accessible over a communication link, such as the network). Thus, in certain aspects, the system may be implemented as one or more computers, as software stored on a memory device accessible by the server, or a combination thereof. For example, one verification system may be a computer hardware executing one or more operations of a verification session, and another verification system may be software that, when executed by the server, performs one or more operations of a verification session.

The user devices 312, 314, verification server 302, and the verification system 300 may be connected or interconnected to one or more databases 304. The one or more databases may be one or more memory devices configured to store data (e.g., verified email address, registration status of a verified user, online account information of registered users, etc.). Additionally, the one or more databases may also, in some embodiments, be implemented as a computer system with a storage device. In one aspect, the one or more databases may be used by components of the network layout to perform one or more operations consistent with the disclosed embodiments. In certain embodiments, the one or more the databases may be co-located with the server, and/or co-located with one another on the network. One of ordinary skill will recognize that the disclosed embodiments are not limited to the configuration and/or arrangement of the one or more databases.

Additionally, while the network is shown in FIG. 3 as a "central" point for communications between the verification system 300 and the two user devices 312, 314 of the network layout, the disclosed embodiments are not limited thereto. For example, one or more components of the network layout may be interconnected in a variety of ways, and may in some embodiments be directly connected to, co-located with, or remote from one another, as one of ordinary skill will appreciate. Additionally, while some disclosed embodiments may be implemented on the server, the disclosed embodiments are not so limited. For instance, in some embodiments, other devices (such as one or more user devices) may be configured to perform one or more of the processes and functionalities consistent with the disclosed embodiments, including embodiments described with respect to the server and the authentication system.

In some instances, the verification system 300 described herein and methods performed thereby can be operated by one entity. Alternatively, the systems and methods can be operated by a plurality of entities. In some cases, the systems and methods can be operated by the same entity that hosts a mail server of the sender and/or the recipient of an email. For example, the systems and methods disclosed herein can be integrated into an existing online communication system or online communication server. In some cases, the systems and methods can be integrated solely in, and performed by, the receiving mail server and/or receiving mail system. In some cases, the systems and methods can be integrated solely in, and performed by, the sending mail server and/or sending mail system. In other cases, the system and methods can be operated by a different entity, such as a third party entity, from the one or more entities that host one or more mail servers of the sender and/or the recipient of the email. In some instances, the same and/or different entity as the entity hosting one or more mail servers of the sender and/or the recipient of the email can collectively or individually perform the operations of the systems and methods described herein.

Although particular computing devices are illustrated and networks described, it is to be appreciated and understood that other computing devices and networks can be utilized without departing from the spirit and scope of the embodiments described herein. In addition, one or more components of the network layout may be interconnected in a variety of ways, and may in some embodiments be directly connected to, co-located with, or remote from one another, as one of ordinary skill will appreciate.

Beneficially, the provided systems and methods can verify online communications without requiring a user to download, install, or otherwise obtain specific software or hardware for security or verification purposes. For example, the systems and methods can utilize a pre-existing online communication interface (e.g., software and/or application) on a user device that has the capabilities of sending and/or receiving an email.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for verifying a first electronic mail (email) from a first user to a second user, the method comprising:
   (a) initiating a verification session, wherein the verification session is initiated by the first user sending the first email simultaneously to both an email address of the second user and an email address of a verification server configured to facilitate verification of online communications, wherein the first email is sent to the verification server using an electronic mail transmission protocol;
   (b) verifying a registration status of the first user with the verification server, wherein verifying the registration status of the first user comprises determining that a return path email address of the first email matches a given verified email address stored in the verification server;
   (c) upon verifying the registration status of the first user, sending a confirmation email from the email address of the verification server to the return path email address of the first email, wherein the confirmation email comprises instructions for confirming that the first user sent the first email;
   (d) receiving a confirmation or denial from the first user; and
   (e) sending a verification notification email or a denial notification email from the email address of the verification server to the email address of the second user if a confirmation or denial is received from the first user, respectively.

2. The method of claim 1, wherein the verification notification email comprises instructions for confirming acceptance of the first email by the second user.

3. The method of claim 2, further comprising (i) receiving a confirmation of acceptance of the first email from the second user, and (ii) sending an acceptance notification email from the email address of the verification server to the return path email address of the first email.

4. The method of claim 1, wherein the given verified email address is stored in the verification server when an owner of the given verified email address is registered to the verification server and has verified ownership of the given verified email address.

5. The method of claim 1, wherein the instructions for confirming is selected from one or more of clicking on a unique confirmation link, button, or hyperlink provided in the body of the confirmation email, re-entering a code or a password provided in the body of the confirmation email into another location, and scanning a code.

6. The method of claim 1, wherein the confirmation email comprises instructions for confirming within a finite time restraint.

7. The method of claim 1, wherein the confirmation email includes a copy of a body of the first email.

8. The method of claim 1, wherein the email address of the verification server is a recipient of a carbon copy of the first email or a blind carbon copy of the first email.

9. The method of claim 1, wherein the verification session is initiated by a recipient of an original email sent from the second user, and wherein the first email is a reply email sent by the first user in response to the original email.

10. A system for verifying a first electronic mail (email) from a first user to a second user, the system comprising:
   a communications interface in communication with a first user device of the first user and a second user device of the second user over a computer network;
   a database configured to store a plurality of verified email addresses; and
   one or more computer processors operatively coupled to the communications interface and the database, wherein the one or more computer processors are individually or collectively programmed to:
      (a) initiate a verification session, wherein the verification session is initiated by the first user, via the first user device, sending the first email simultaneously to both an email address of the second user and an email address of the communications interface, wherein the first email is sent to the verification server using an electronic mail transmission protocol;
      (b) verify a registration status of the first user, wherein verifying the registration status of the first user comprises determining that a return path email address of the first email matches a given verified email address from the plurality of verified email addresses stored in the database;

(c) upon verifying the registration status of the first user, send a confirmation email from the email address of the communications interface to the return path email address of the first email, wherein the confirmation email comprises instructions for confirming that the first user sent the first email;

(d) receive a confirmation or denial from the first user device of the first user; and (e) send a verification notification email or a denial notification email from the email address of the communications interface to the email address of the second user, to the second user device, if a confirmation or denial is received from the first user, respectively.

11. The system of claim 10, wherein the verification notification email comprises instructions for confirming acceptance of the first email by the second user.

12. The system of claim 11, wherein the one or more computer processors are individually or collectively programmed to: (i) receive a confirmation of acceptance of the first email from the second user device of the second user, and (ii) send an acceptance notification email from the email address of the verification server to the return path email address of the first email.

13. The system of claim 10, wherein the given verified email address is stored in the database when an owner of the given verified email address has verified ownership of the given verified email address.

14. The system of claim 10, wherein the instructions for confirming is selected from one or more of clicking on a unique confirmation link, button, or hyperlink provided in the body of the confirmation email, re-entering a code or a password provided in the body of the confirmation email into another location, and scanning a code.

15. The system of claim 10, wherein the confirmation email comprises instructions for confirming within a finite time restraint.

16. The system of claim 10, wherein the confirmation email includes a copy of a body of the first email.

17. The system of claim 10, wherein the email address of the verification server is a recipient of a carbon copy of the first email.

18. The system of claim 10, wherein the email address of the verification server is a recipient of a blind carbon copy of the first email.

19. A computer-implemented method for verifying a first electronic mail (email) from a first user to a second user, the method comprising:

(a) initiating a verification session, wherein the verification session is initiated by the first user sending the first email simultaneously to both an email address of the second user and an email address of a verification server configured to facilitate verification of online communications, wherein the first email is sent to the verification server using an electronic mail transmission protocol;

(b) sending a confirmation email from the email address of the verification server to the return path email address of the first email, wherein the confirmation email comprises instructions for confirming that the first user sent the first email with a finite time limit;

(c) confirming a lack of response from the return path email address of the first email during the finite time limit; and (d) upon lapse of the finite time limit, sending a denial notification email from the email address of the verification server to the email address of the second user.

20. The method of claim 19, wherein the confirmation email includes a copy of a body of the first email.

* * * * *